United States Patent
Hee et al.

(10) Patent No.: US 7,144,640 B2
(45) Date of Patent: Dec. 5, 2006

(54) TILTED MEDIA FOR HARD DISK DRIVES AND MAGNETIC DATA STORAGE DEVICES

(75) Inventors: Ching Hian Hee, Menglembu (MY); Jian Ping Wang, Shoreveiw, MN (US); Haibao Zhao, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 0 days.

(21) Appl. No.: 10/632,522

(22) Filed: Aug. 1, 2003

(65) Prior Publication Data

US 2005/0084715 A1   Apr. 21, 2005

(51) Int. Cl.
  *G11B 5/66*  (2006.01)
  *G11B 5/70*  (2006.01)
(52) U.S. Cl. .................... 428/827; 428/828
(58) Field of Classification Search .......... 428/827, 428/828, 830
  See application file for complete search history.

(56) References Cited

U.S. PATENT DOCUMENTS

| | | | |
|---|---|---|---|
| 5,496,620 A | 3/1996 | Kitakami et al. | 428/212 |
| 5,534,324 A * | 7/1996 | Sugita et al. | 428/829 |
| 5,569,523 A * | 10/1996 | Thoma et al. | 428/213 |
| 5,998,048 A | 12/1999 | Jin et al. | 428/694 T |
| 6,387,476 B1 | 5/2002 | Iwasaki et al. | 365/170 |
| 6,483,741 B1 | 11/2002 | Iwasaki et al. | 428/212 |
| 6,500,570 B1 | 12/2002 | Hasegawa et al. | 428/692 |
| 2003/0039863 A1 | 2/2003 | Chen et al. | 428/694 TM |
| 2003/0048676 A1 | 3/2003 | Daughton et al. | 365/200 |
| 2004/0233578 A1* | 11/2004 | Gao | 360/125 |
| 2005/0214585 A1* | 9/2005 | Li et al. | 428/828 |

OTHER PUBLICATIONS

Wang, et al., "Approaches to Tilted Magnetic Recording for Extremely High Areal Density" IEEE Transactions on Magnetics, Jul. 2003, vol. 39, Issue 4, Part 1, pp. 1930-1935.

Matsubara, et al., "Magnetization Behavior In Exchange-Coupled Co/TbFeCo Films", IEEE Transactions on Magnetics, Sep. 1990, vol. 26, Issue 5, pp. 1906-1908.

* cited by examiner

*Primary Examiner*—Holly Rickman
(74) *Attorney, Agent, or Firm*—Hogan & Hartson LLP

(57) ABSTRACT

A digital storage medium for use in data storage devices has two magnetic layers where the respective easy axes of the magnetic moments in the two layers are perpendicular to each other. Exchange coupling of the magnetic moments in the magnetic layers produces a resultant magnetic moment that is tilted out of the plane of the digital storage medium. The resultant magnetic moment of the medium allows the use of either a ring head, a single pole head, or a head that generates a field tilted at an angle for write operations.

20 Claims, 12 Drawing Sheets

TILTED MEDIA FOR HARD DISK DRIVES AND MAGNETIC DATA STORAGE DEVICES

TECHNICAL FIELD

This invention relates to magnetic media used in data storage devices, and more particularly to magnetic media that use either a ring head or a pole head for write operations.

BACKGROUND OF THE INVENTION

A conventional magnetic storage medium includes a substrate supporting an underlayer disposed under a magnetic layer protected by an overcoating layer. These layers are usually deposited using a sputtering process. The magnetic layer is typically formed from a granular ferromagnetic material such as a cobalt alloy, in which data bits are stored. Transitions of magnetization in the tiny grains of the magnetic layer are used to store data and generate signals, which may then be read or written by a read/write head.

Magnetic layers are typically classified as being either longitudinal or perpendicular. In a longitudinal magnetic storage medium, the magnetic moments of the grains are aligned parallel to the plane of the substrate surface of the storage medium. In perpendicular magnetic media, the magnetic moments of the grains are aligned perpendicular to this plane. A longitudinal recording system uses a ring head for write operations while a perpendicular recording system uses a single pole head for write operations.

As the demand for storage space grows, there is a constant need to increase the areal density in magnetic storage media. To do so, the number of grains in a medium is increased by decreasing the size of the magnetic grains. This reduction in grain size also leads to sharper transitions and a higher signal to noise ratio (SNR), which improves data recording. Unfortunately, a major problem with reducing grain size is that it leads to decreased thermal stability.

Maintaining thermal stability of the magnetic grains is critical to data retention, particularly over longer periods of time. If the grains are unstable, then it is likely that data may be lost through magnetization decay. The energy required to store and maintain the stability of written bits of data is known as magnetic-anisotropy energy, $K_u V$, where $K_u$ is the anisotropy constant and V is the volume of the grain. Below a certain grain size, the magnetic layer will experience what is known as a super-paramagnetic effect due to the decrease of this magnetic-anisotropy-energy.

To ensure thermal stability of the grains and minimize the tendency for magnetization decay, a thermal stability factor is used as a reference to determine the stability of the grains with respect to the life span of the media. This thermal stability factor is defined by the magnetic-anisotropy energy over the thermal energy of the magnetic media:

$$\frac{K_u V}{k_B T},$$

where T is the temperature and $k_B$ is the Boltzmann constant.

For example, a medium with thermal stability factor of 60, the industry standard, has a life span of about $3.6 \times 10^9$ years. If the thermal stability factor is reduced, the life span of the medium is reduced accordingly. At a thermal stability factor of 40, for example, the life span would be approximately 7.5 years, and at 25, the life span of the media is approximately 72 seconds). It is therefore important to have this factor at or above 40 to ensure that data stored in a medium resists magnetization decay over a sufficiently long period of time.

While it would be ideal to use materials that have a higher $K_u$ to maintain the thermal stability factor while V is reduced, conventional longitudinal recording systems are limited by the ring heads that are used. Currently, the ring heads have a maximum head field of 2 Tesla. This head field limits the $K_u$ of the digital storage medium to about $2.1 \times 10^6$ erg/cm$^3$. This limit thus imposes a highly undesirable minimum threshold on grain size to maintain the thermal stability factor. In contrast, perpendicular recording systems using a single pole head are able to generate a higher field relative to that of the ring head. Unfortunately, perpendicular recording systems are subject to limitations and problems that have prevented the technology from being more widespread. In particular, excessive noise interference is caused by a soft underlayer used in a perpendicular medium. Although perpendicular media have greater thermal stability than longitudinal media, the coercivity in the perpendicular medium is considerably higher. This high coercivity requires higher switching field energy to perform write operations, which may cause further noise interference. Thus, perpendicular recording systems are not a commercially viable option.

In view of the foregoing, it is desirable to devise magnetic recording disk media that will allow increases in areal density while preventing magnetization decay. To overcome the limitations of existing magnetic recording systems, there is a need to have a magnetic recording medium that allows continued reduction of grain size while preventing excessive interference from noise. In addition, it is also desirable to have a magnetic recording medium that maintains thermal stability as grain size is reduced.

SUMMARY OF THE INVENTION

The present invention provides a digital storage medium with a substrate upon which two magnetic layers are disposed and protected by an overcoat. The first magnetic layer is disposed on the substrate while the second magnetic layer is disposed on the fist magnetic layer. The first of the two magnetic layers has a first magnetic moment with an easy axis that is tilted and the second magnetic layer has a second magnetic moment with an easy axis that is also tilted. The tilted axes are formed under the influence of exchange-coupling between the first and second magnetic layers. The tilted axes, which are biaxial, form acute angles with a plane perpendicular to the surface of the digital storage medium. The angles of the tilted easy axes in the two magnetic layers may have magnitudes that are the same or different. The tilted easy axes of the magnetic moments in the present invention provide the advantage of writing data on the digital storage medium with either a longitudinal ring head, a perpendicular single-pole head, or any newly developed tilted field head.

A nickel phosphorous seed layer is coated onto the substrate, an underlayer is disposed on the seed layer, an intermediate layer is disposed over the underlayer, and the first magnetic layer is disposed over the intermediate layer. A soft underlayer may also be disposed between the underlayer and the interlayer.

In one embodiment, an interlayer is disposed between the first and second magnetic layers. The interlayer can be cobalt, a cobalt alloy, or a non-magnetic material such as ruthenium (Ru), rhodium (Rh), chromium (Cr), copper (Cu), iridium (Ir), or alloys of any of these materials. With a non-magnetic material as the interlayer, the tilted easy axes of the first and second magnetic moments are anti-parallel where cobalt or alloys of cobalt are used for the interlayer, the easy axis of the first and second magnetic layers are parallel. The magnetic thickness of the digital storage medium is the combined thickness of the first and second magnetic layers, in addition to the thickness of the interlayer, if one is disposed between the two magnetic layers.

In one embodiment of the present invention, the first magnetic layer has a perpendicular magnetic anisotropy in which the easy axis of the magnetic moment in the first magnetic layer is perpendicular to the plane of the digital storage medium, and the second magnetic layer has a longitudinal anisotropy in which the easy axis of the magnetic moment in the second magnetic layer is parallel to the plane of the digital storage medium. Alternatively, the first magnetic layer has a longitudinal magnetic anisotropy and the second magnetic layer has a perpendicular magnetic anisotropy with respect to the plane of the digital storage medium. The magnetic layer with longitudinal anisotropy is formed with a ferromagnetic material selected from a group consisting of cobalt (Co), iron (Fe), nickel (Ni), or alloys of these ferromagnetic materials while the magnetic layer with the perpendicular anisotropy is formed with ferromagnetic materials like cobalt, iron, and their alloys. The magnetic layer with perpendicular anisotropy is a single layer of an alloy like cobalt-chromium-platinum (CoCrPt), cobalt-chromium-platinum-boron (CoCrPtB), cobalt-chromium-platinum-tantalum (CoCrPtTa), cobalt-chromium-platinum-niobium (CoCrPtNb), or iron-platinum (FePt). The single layer can also be formed from alloys of cobalt that are doped with non-magnetic materials like silicon oxide and silicon nitride.

The perpendicular magnetic layer may also be formed from multiple layers of the same ferromagnetic materials with spacer layers between the multiple layers of ferromagnetic material. The ferromagnetic material forming the multiple layers can include cobalt, cobalt oxides, and cobalt alloys, while the spacer layer can include palladium or platinum. The cobalt alloys include cobalt-silver (Co—Ag), cobalt-boron (Co—B), cobalt-chromium (Co—Cr), cobalt-copper (Co—Cu), cobalt-palladium (Co—Pd), and cobalt-tantalum (Co—Ta).

In another aspect of the invention, a method of manufacturing the digital storage medium of the present invention is provided. The method provides for deposition of a first magnetic layer on a substrate followed by a second magnetic layer, where the first magnetic layer has a first magnetic moment with a first easy axis, and the second magnetic layer has a second magnetic moment with a second easy axis such that the two easy axes are perpendicular to each other. Exchange-coupling of the magnetic moments of the two magnetic layers result in the easy axes effectively tilting out of plane of the digital storage medium. The tilted easy axes of the present method form acute angles with a plane perpendicular to the plane of the digital storage medium. The magnitude of the acute angles depends on the exchange coupling strength, as well as the anisotropy energies of the respective magnetic layers. The anisotropy energies of the respective magnetic layers compete to attain a stable tilted configuration of the easy axes. The competition of the anisotropy energies is influenced by the exchange-coupling constant, anisotropy constant which can be changed by varying the type of ferromagnetic materials in the magnetic layers as well as the thickness of the respective magnetic layers. The thicknesses of the first and second magnetic layers are variable. The exchange-coupling between the first and second magnetic layers increases the activation volume, V, through the combined thickness of the two magnetic layers, and hence increases the thermal stability of the digital recording or storage medium according to the thermal stability factor, $$\frac{K_u V}{k_B T}.$$

The exchange-coupling constant between the first and second magnetic layers is variable.

The method of the present invention provides for one magnetic layer having longitudinal anisotropy, where the easy axis of the magnetic moment in the magnetic layer is parallel to the plane of the digital storage medium, and another magnetic layer having perpendicular anisotropy, where the easy axis of the magnetic moment is perpendicular to the plane of the digital storage medium. The magnetic layer with perpendicular anisotropy is disposed over the magnetic layer with longitudinal anisotropy, or alternatively, the magnetic layer with the longitudinal anisotropy is disposed over the magnetic layer with perpendicular anisotropy. The magnetic layer with longitudinal anisotropy is formed with a ferromagnetic material selected from a group consisting of cobalt (Co), iron (Fe), nickel (Ni), and the alloys of these ferromagnetic materials while the magnetic layer with the perpendicular anisotropy is formed with ferromagnetic materials like cobalt, iron and their alloys. The magnetic layer with perpendicular anisotropy can take the form of a single layer of alloys of ferromagnetic materials like cobalt-chromium-platinum (CoCrPt), cobalt-chromium-platinum-boron (CoCrPtB), cobalt-chromium-platinum-tantalum (CoCrPtTa), cobalt-chromium-platinum-niobium (CoCrPtNb) and iron-platinum (FePt). The single layer can also be formed from alloys of cobalt which are doped with non-magnetic materials like silicon oxide and silicon nitride. Alternatively, the magnetic layer with perpendicular anisotropy is formed from multiple layers of the same ferromagnetic materials with spacer layers between the multiple layers of ferromagnetic material. The ferromagnetic material can be cobalt, cobalt oxides and cobalt alloys and the spacer layer includes palladium and platinum. The cobalt alloys includes cobalt-silver (Co—Ag), cobalt-boron (Co—B), cobalt-chromium (Co—Cr), cobalt-copper (Co—Cu), cobalt-palladium (Co—Pd) and cobalt-tantalum (Co—Ta).

An underlayer can be disposed between the substrate and the first magnetic layer, and a seed layer can be disposed on the substrate before the underlayer. An additional soft underlay can be disposed on the underlayer. An intermediate layer can then be disposed between the underlayer and the first magnetic layer. An interlayer can be disposed under the first magnetic layer. The interlayer is selected from a group of high saturation magnetization materials like pure cobalt, alloys and compounds of cobalt, nickel, iron, alloys of nickel and alloys of iron to enhance exchange-coupling at the interface of the first and second magnetic layers. Alternatively, the interlayer is selected from a group of nonmagnetic materials consisting of ruthenium (Ru), rhodium (Rh), chromium (Cr), copper (Cu), iridium (Ir), and their alloys such that the first magnetic layer is anti-ferromagnetically exchange-coupled to the second magnetic layer. The interlayer is of a variable thickness generally less than 1 nm.

The present invention has a recording direction that is independent of the types of head used for write operations due to the natural formation of the bi-axial easy axis in the system. Thus, the present invention provides a method of manufacturing a recording medium that can be used with any read/write head independent of the field direction of the read/write head.

Furthermore, due to the titled direction of the magnetic moment to writing field of either a ring head or single pole head, a much higher anisotropy constant, $K_u$, can be used to increase the thermal stability while maintaining the writeable switching field value. The magnetic medium also enables sharper magnetic transitions due to the reduction of the switching fields in the titled transition. This results in a higher linear bit density for the medium.

BRIEF DESCRIPTION OF THE DRAWINGS

The details of the present invention will become apparent by reference to the following description and accompanying drawings, in which.

DETAILED DESCRIPTION OF PREFERRED EMBODIMENTS

Figure 1:
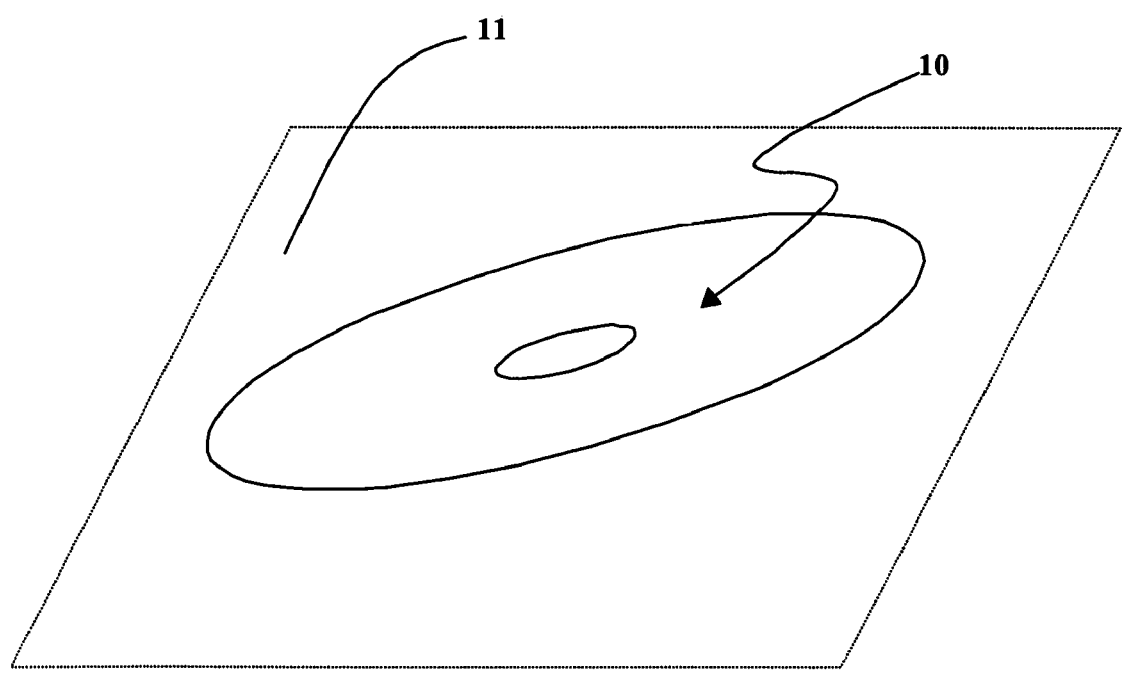
FIG. 1 is a perspective view of a data storage disc embodying the present invention lying in a plane.
Figure 2:
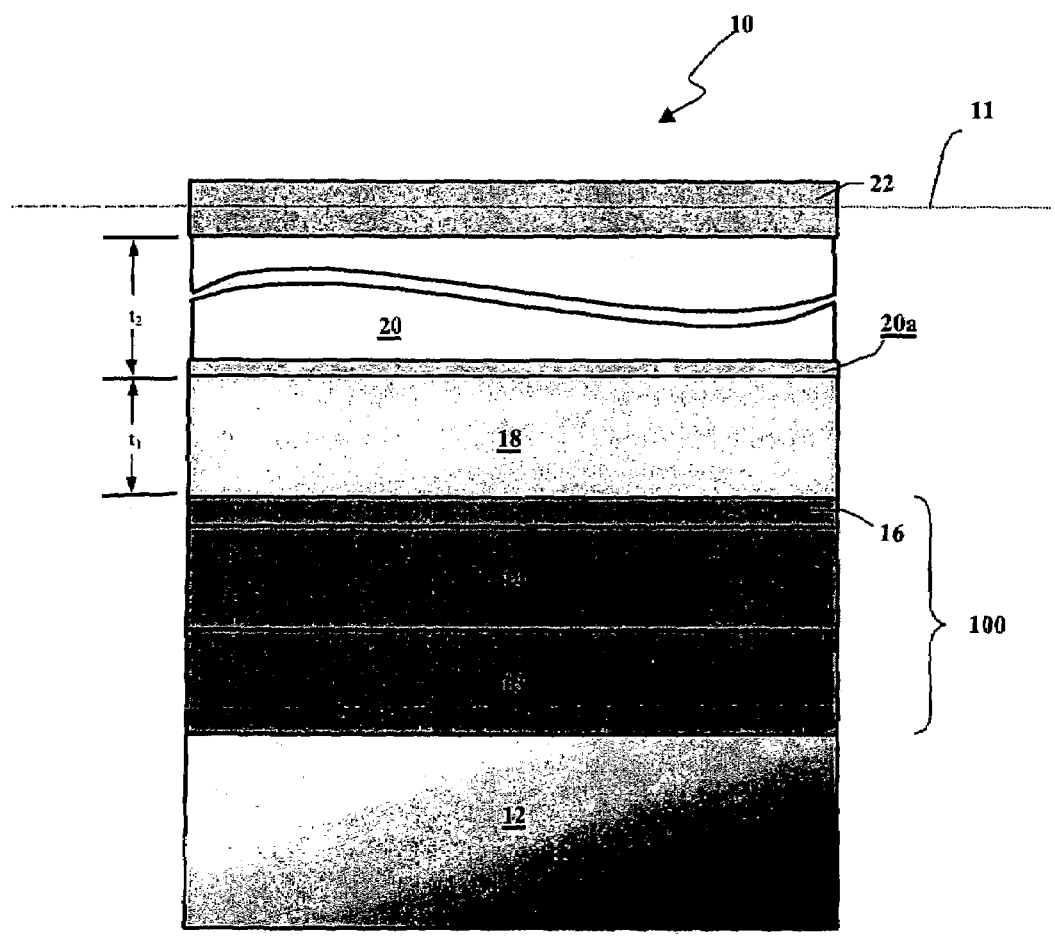
FIG. 2 is a cross-sectional view of the structure of an embodiment of a digital medium of the present invention.

FIG. 1 shows a digital storage medium 10 in the form of a disk lying in a plane 11. The digital storage medium 10 typically includes a substrate 12, upon which a seed layer 13 is disposed followed by an underlayer 14 as illustrated in FIG. 2 where the cross section of the digital medium is shown. An intermediate layer 16 is disposed on top of the underlayer as in a typical disk storage medium. A first magnetic layer 18 is then deposited on the intermediate layer 16. The seed layer 13, underlayer 14, and intermediate layer 16 are represented jointly in subsequent figures as a combined layer denoted as 100. The first magnetic layer 18 forms the bottom magnetic layer upon which a second magnetic layer 20 is deposited. The second magnetic layer includes a series of alternating layers of ferromagnetic materials and spacer layers. A protective overcoat 22 is then deposited on the second magnetic layer 20.

Figure 3:
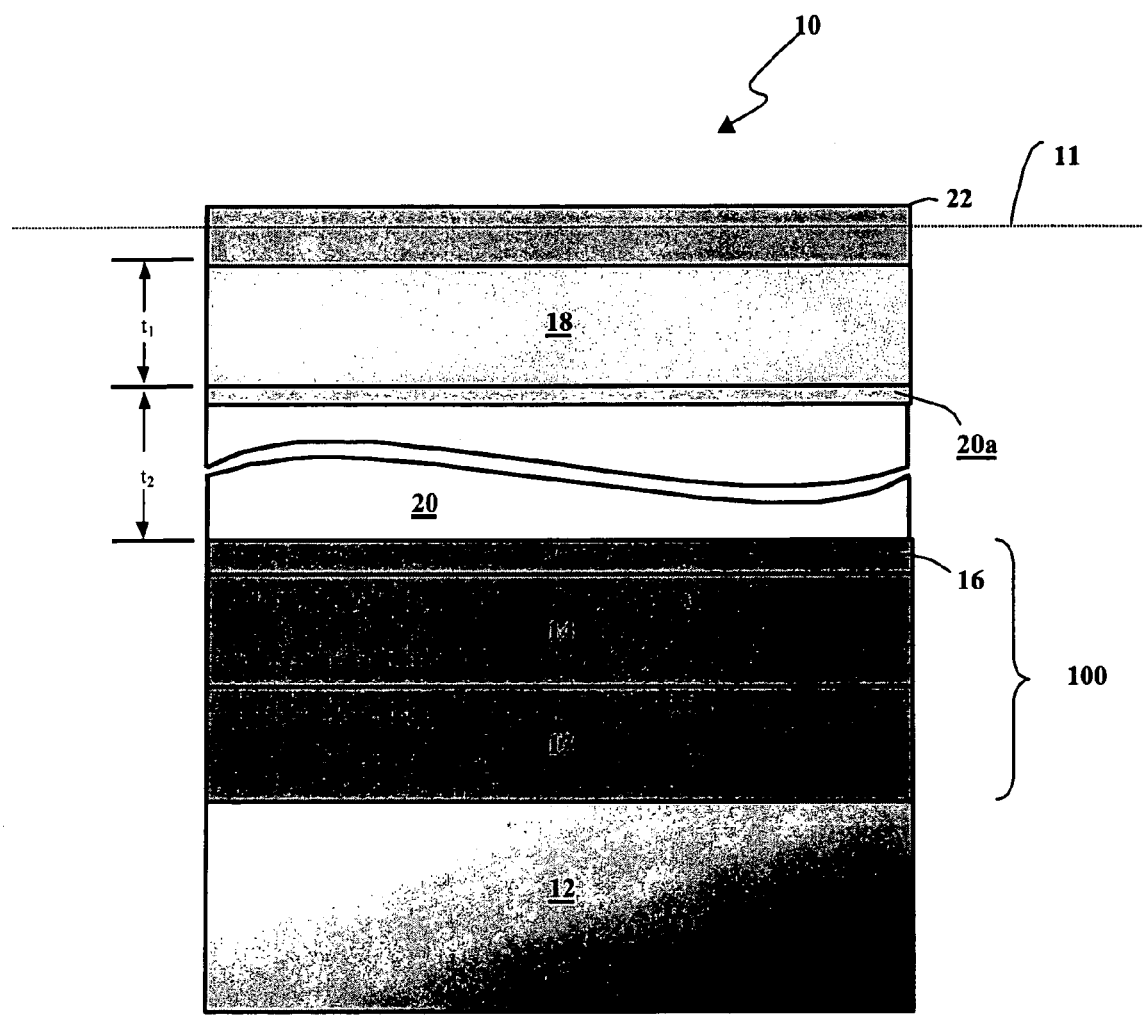
FIG. 3 is a cross-sectional view of the structure of another embodiment of a digital medium of the present invention.

The second magnetic layer 20 can be switched with the first magnetic layer 18 such that the bottom layer is the second magnetic layer 20 and the top layer is the first magnetic layer 18 as shown in FIG. 3. An interlayer 20a may be included between the first and second magnetic layers in either of the arrangements shown in FIG. 2 and FIG. 3. This interlayer will be discussed in detail with reference to FIG. 12 and FIG. 13.

Figure 4:
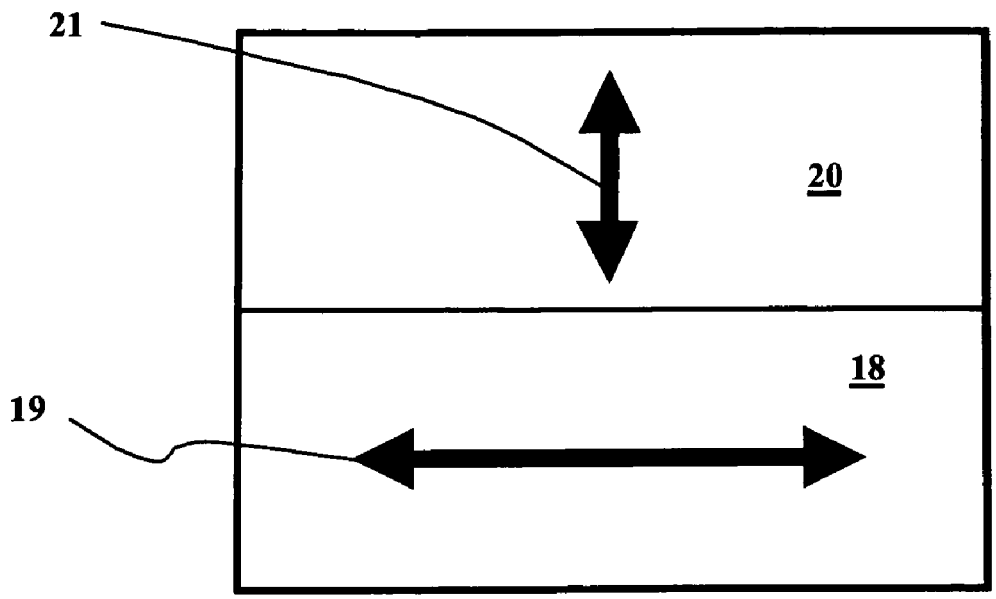
FIG. 4 is a schematic illustration of an orientation of the easy axes of the two magnetic layers of the embodiment of FIG. 2.
Figure 5:
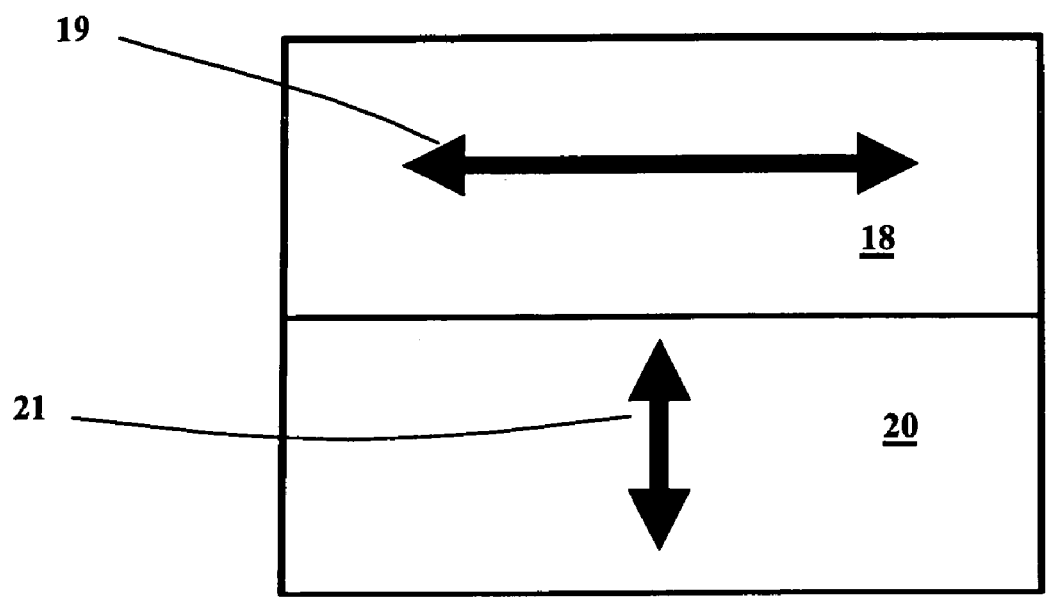
FIG. 5 is a schematic illustration of another orientation of the easy axes of the two magnetic layers of the embodiment of FIG. 3.

The relationship between the first magnetic layer 18 and the second magnetic layer 20 of the arrangement illustrated in the embodiment of FIG. 2 is further discussed with reference to FIG. 4. The first magnetic layer 18 has a first magnetic moment having a first easy axis 19. Similarly, the second magnetic layer 20 has a second magnetic moment with a second easy axis 21. These easy axes are uniaxial in that the moments of the magnetic grains are orientated in one direction of the easy axes. In FIG. 4, the first easy axis 19 is parallel to the plane 11 of the surface of the digital storage medium 10 and the second easy axis 21 is perpendicular to the first easy axis 19. In the embodiment of FIG. 3, the top magnetic layer 18 has a first easy axis 19 parallel to the surface of the digital storage medium 10 while the bottom magnetic layer 20 has a second easy axis 21 perpendicular to the first easy axis 19 as shown in FIG. 5.

In this invention, the easy axes for the magnetic layers are deliberately designed such that each is perpendicular to the other. When the two magnetic layers are magnetically isolated or not exchange-coupled, the remnant moments at the respective layers align in the directions of the easy axes of the respective layers. Thus, in one layer the easy axis is perpendicular to the plane of the magnetic layers while the other easy axis lies in the same plane as the magnetic layers. When exchange-coupling is introduced at the interface between the two magnetic layers, a new energy is introduced and the magnetic moments tend to align together. The two exchange-coupled moments pull towards each other, but this pull is restricted by the anisotropy energy that exists in each respective magnetic layer. As illustrated in FIG. 4 and FIG. 5, the two easy axes which are perpendicular to each other have exchange-coupling linking together the magnetic moments from the two magnetic layers. At the same time, though, a competition is created between the anisotropy energies from the respective magnetic layers. When a balance of the competing anisotropy energies is achieved, a new easy axis with a different configuration is generated. The new easy axes tilt at an angle out of the plane 11 in which the magnetic layers 18 and 20 lie. This phenomenon of exchange-coupling at the interface of the magnetic layers will become apparent from FIG. 6 and FIG. 7.

Figure 6:
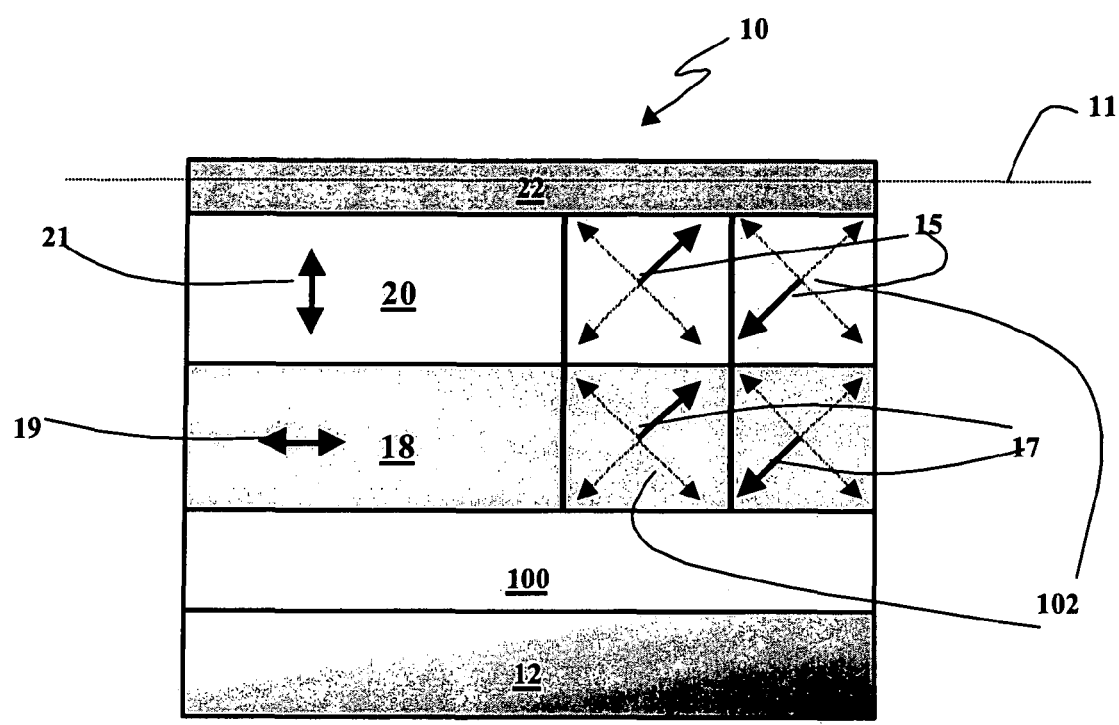
FIG. 6 is a schematic sectional view of the interaction of magnetic moments of the two magnetic layers of the present invention.
Figure 7:
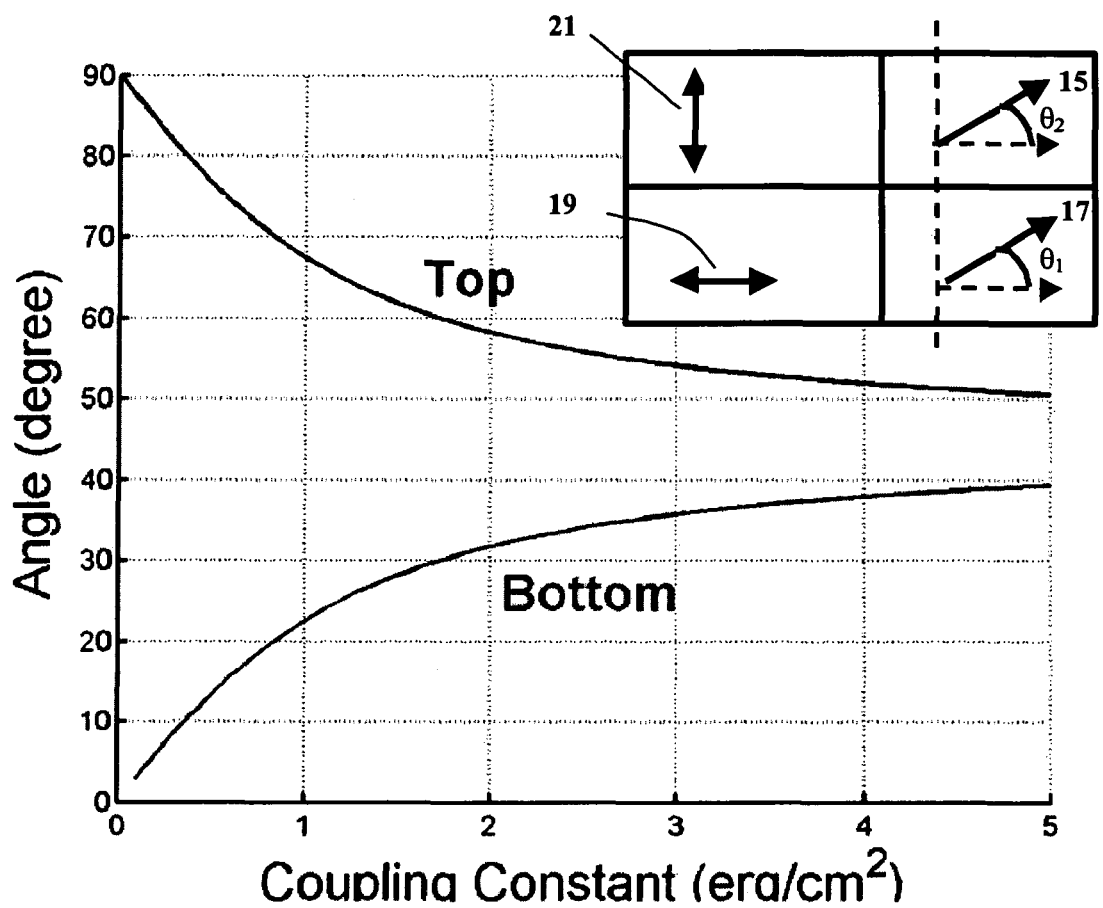
FIG. 7 is a graph illustrating the relationship of the tilted angle with the coupling constant.

FIG. 6 illustrates the interaction between the respective magnetic moments of the first 20 and second 18 magnetic layers. The interaction of the magnetic moments results in remnant magnetic moments, $M_1$ (15) and $M_2$ (17). The respective remnant magnetic moments are: $M_1=M_{r1}t_1$ and $M_2=M_{r2}t_2$, where $M_{r1}$ and $M_{r2}$ are the remnant magnetization from the respective magnetic layers due to exchange coupling at the interface of the two magnetic layers, and $t_1$ and $t_2$ are the respective thicknesses of the magnetic layers. The exchange-coupling in the present design is utilized for forming remnant magnetic moments 15 and 17 which tilt at an acute angle to the plane 11. The tilting of the magnetic moments at an acute angle provides an advantage over existing prior art, in which the magnetic moments are either longitudinal or perpendicular with respect to the plane of the medium. The magnitudes of the acute angles, $\theta_1$ and $\theta_2$, at which the remnant magnetic moments tilt depends on the exchange-coupling strength between the magnetic moments of the two magnetic layers. The graph of FIG. 7 illustrates the effect of the exchange-coupling constant on the angles $\theta_1$ and $\theta_2$ of the remnant magnetic moments $M_1$ and $M_2$. In this example, both magnetic layers have the same anisotropy constant and thickness. As the exchange-coupling constant increases, the angle $\theta_2$ of the second easy axis 21 decreases while the angle $\theta_1$ of the first easy axis 19 increases. Therefore, an exchange-coupling constant has to be selected to have the remnant magnetic moments tilted at a desired angle. Depending on the exchange-coupling strength, the angles of the easy axes in the two magnetic layers will tilt at different angles (i.e. $\theta_1 \neq \theta_2$). The tilting angle is influenced by the competition of the anisotropy energies between the magnetic layers in an exchange-coupled system. The anisotropy energy for the respective magnetic layer can be varied to adjust the tilting angle. The strength of the anisotropy energy or the anisotropy density in each magnetic layer is determined by the thickness and anisotropy constant of the magnetic layer. The principle in this design is to control the competing energies between the two anisotropy energies in the perpendicular direction to each other when both are exchange coupled. As such, varying the anisotropy constants, $K_{u1}$ and $K_{u2}$, of the respective magnetic layers will affect the competition of the anisotropy energies in the exchange-coupled system and the moment will tilt in the direction of the dominant anisotropy. Therefore, the tilting angle is also dependent on the anisotropy constant, $K_{u1}$, of the first magnetic layer 18 and $K_{u2}$, of the second magnetic layer 20. This can be achieved by varying the magnetic properties of the two magnetic layers. Once the magnetic materials for the respective magnetic layers are selected, the anisotropy constants of the magnetic layers are constant. However, while the anisotropy constants $K_{u1}$, and $Ku_2$, of the respective magnetic layers 18 and 20 are unchanged, the interaction through exchange-coupling of the two magnetic layers gives rise to an effective anisotropy constant, $K_{u,eff}$ for the combined magnetic layers. Thus the exchange coupling between the two magnetic layers brings about a new magnetic property of the digital storage medium 10. The overall magnetic property of the digital storage medium 10 is thus determined by the exchange-coupling of the selected magnetic properties of the respective magnetic layers. The overall effective anisotropy constant, $K_{u,eff}$, takes on a new value that is different from either of the anisotropy constants, $K_{u1}$ and $K_{u2}$, of the respective magnetic layers.

The magnitude of the tilting angle can also be controlled by adjusting the thickness of each magnetic layer since varying the thickness varies the anisotropy energy of that layer. The overall magnetic properties may tend towards the magnetic layer having stronger magnetic properties in view of the competing energies from the two magnetic layers in the exchange-coupled system.

The overall remnant magnetic moment is: $M_r=M_1+M_2$. It follows from the above that if the remnant magnetic moment of one magnetic layer dominates the other, the overall remnant magnetic moment will tend towards the dominant magnetic moment under the influence of the competing energies in the exchange coupling system. The exchange-coupling system provides flexibility in enabling the design of a medium with particular magnetic properties by selection of ferromagnetic materials to form the magnetic layers in the digital storage medium.

The exchange-coupling of the magnetic moments between the two magnetic layers provides an advantage through increasing the activation volume, V, of the digital storage magnetic medium 10. The activation volume is: $V=D \cdot t$, where D is the diameter of the grain and t is the magnetic thickness of the digital storage medium. The magnetic thickness for the exchange coupled system is: $t=t_1+t_2$, where $t_1$ is the thickness of the magnetic layer 18 and $t_2$ is the thickness of the magnetic layer 20 as shown in FIG. 2 and FIG. 3. From this relationship, $V=D \cdot t$, an increase in the thickness of the magnetic layers is directly proportional to the effective activation volume, V, of the exchange-coupled digital storage medium 10. The present exchange coupled system enables a decrease in grain size in the magnetic layers while increasing the overall activation volume since the effective thickness of the medium is the combined thickness of the two magnetic layers. By increasing the thickness of the medium, vertical expansion of the medium is achieved, which leads to improved thermal stability of the digital storage magnetic medium 10.

The increase in this coupled magnetic activation volume, V, is important for determining thermal stability of the exchange-coupled system. The magnetic-anisotropy energy of the exchange-coupled system is: $K_{u,eff}V$, while the thermal energy is: $k_BT$. Therefore, the thermal stability factor of the exchange-coupled system is:

$$\frac{K_{u,eff}V}{k_BT}.$$

An increase in the magnetic-anisotropy-energy, $K_{u,eff}V$ of the exchange-coupled system provides greater thermal stability as compared to a prior art magnetic medium which is not exchange-coupled. The thermal stability of the tilted medium in the present invention can be increased through increasing the magnetic anisotropy energy, which can be achieved by increasing the overall effective anisotropy constant, $K_{u,eff}$, or the activation volume, V. The activation volume, V, when increased vertically, would contribute to an increase in the thermal stability of the tilted medium. However, if the activation volume is increased through horizontal expansion, it can be easily seen from the relation $V=Dt$ that a horizontal expansion of the medium indicates increase in D, which means a horizontal increase in domain size. This would translate into a decrease in areal density, which is not desired. Hence, the selection of the magnetic materials for the respective layers is important to ensure that the activation volume is increased only vertically through the thickness, t, of the medium.

Figure 8:
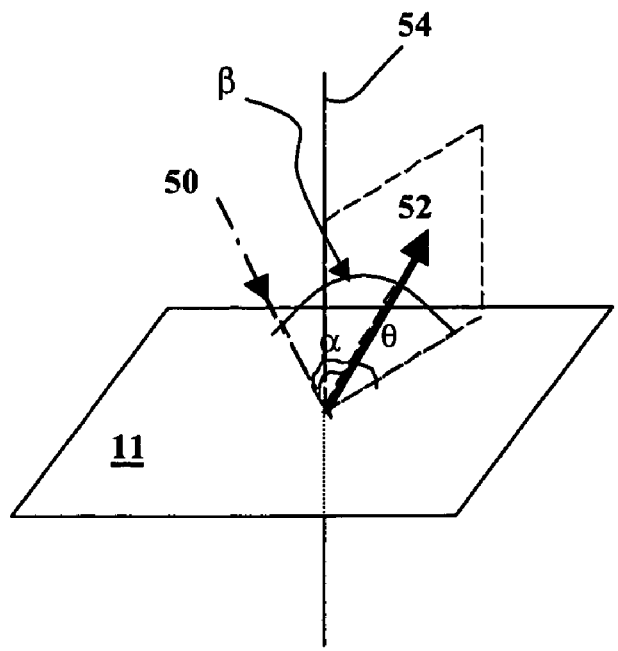
FIG. 8 is a perspective view illustrating the relationship of the applied field, the easy axis and the plane of the magnetic medium.

FIG. 8 shows the relationship of the direction of the applied field 50, the easy axis 52 and the plane 11 in which the magnetic medium lies. The easy axis forms an angle θ with the plane 11, while the applied field forms an angle αx with the easy axis. The sum of these two angles is β (i.e., β=α+θ). From this illustration, the effects of having a medium with magnetic moments tilted at an angle θ is discussed in connection with FIG. 9.

Figure 9:
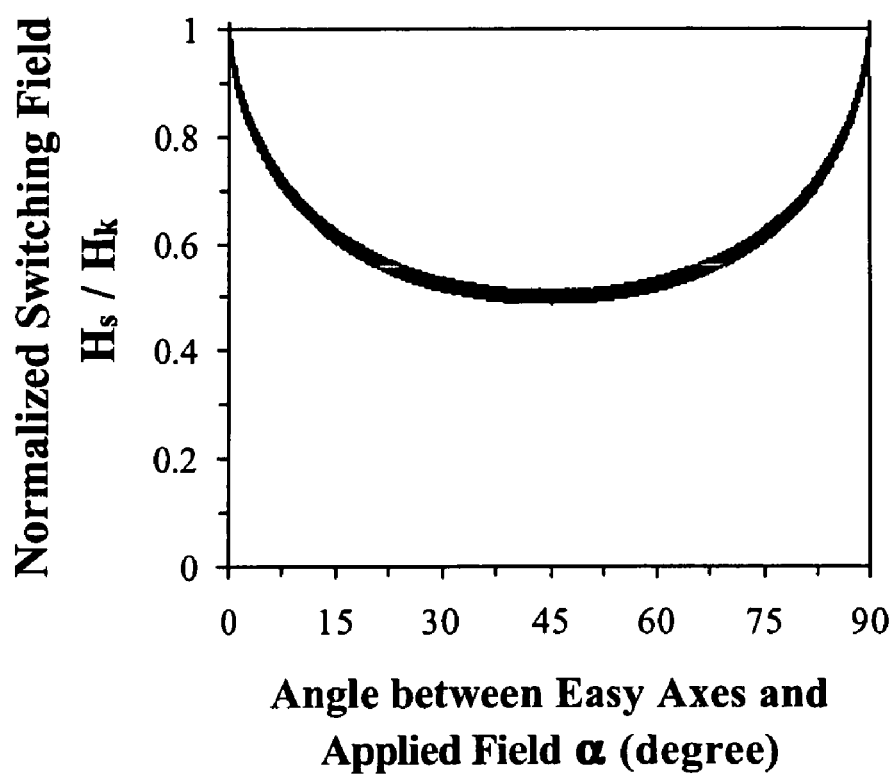
FIG. 9 is a graph based on a Stoner-Wolfarth model of the normalized switching field in relation to the angle of the tilted magnetic moment in a magnetic medium having a single magnetic layer.

FIG. 9 shows the ratio of switching field and anisotropy field ($H_s/H_k$) in relation to the angle, α, between the tilted easy axis and the applied field direction. It is observed that the ratio of the switching field and anisotropy field decreases as the angle α of the tilted easy axis increases from 0° to 45° and then increases as α increases further to 90°. If the anisotropy field $H_k$ is kept constant, the switching field $H_s$ reaches a minimum when the magnetic moment is tilted at an angle, α=45° to the applied field direction. This means that for the same magnitude of applied field, the anisotropy constant, $K_u$, of the tilted magnetic medium can be increased while the writability of the medium is maintained. Therefore, the thermal stability of a tilted medium can be further improved by using materials of high anisotropy constant, $K_u$. So long as the easy axis of the medium is angled between α=0° and α=90°, the switching field, $H_s$, required for performing write operations by a transducer head will be less than that required for write operations in a longitudinal or perpendicular recording medium. This shows that the present invention provides an advantage in that the tilted medium can be paired with either a ring head, a single pole head, or a tilted head for write operations. The anisotropy constant, $K_u$, is related to the anisotropy field such that $$K_u = \frac{H_k M_s}{2},$$

where $M_s$ is the saturation magnetization, which is kept constant. From FIG. 9, the relationship: $H_s/H_k=X$ is illustrated, where $X=f(\alpha)$ and α is the angle between the easy axis and the applied field. Therefore $K_u$ can also be expressed in relation to the switching field, $H_s$:

$$K_u = \frac{H_s M_s}{2X}.$$

For optimum writing operations, the external writing field, $H_g=1.5H_s$ and so $$K_u = \frac{H_g M_s}{3X}.$$

In a longitudinal or perpendicular system where the magnetic moments are not tilted at an acute angle, (i.e. when α=0° or 90°), $X=f(\alpha)=1$, leaving $$K_u = \frac{H_g M_s}{3}.$$

When the magnetic moments are angled such that α=45°, $X=f(\alpha)=0.5$, which gives $$K_u = 2\frac{H_g M_s}{3}.$$

It is evident that given the same writing field, $H_g$, and saturation magnetization, $M_s$, when the magnetic moments are tilted at an angle of 45°, the anisotropy constant $K_u$ is doubled as compared to having magnetic moments at 0° or 90°. Therefore, a lower switching field also enables an increase in the anisotropy constant for the same writing field. To illustrate this, it is assumed that saturation magnetization, $M_s$=400 cmu/cm³ and the writing gap field, $H_g$=16 kOe, where the head field, $B_o$=2 Tesla and the optimum writing field is at 80% of $B_o$. Using the relationship above, the value of $K_u$=2.1×10⁶ erg/cm³ when X=1 (i.e., when the angle α=0° or 90°); and the value of $K_u$=4.3×10⁶ erg/cm³ when X=0.5 (i.e. when the angel α=45°). It is shown in this illustration that the anisotropy constant, $K_u$, is increased when the magnetic moments tilt at an angle θ between 0° and 90° in the same applied field.

Figure 10:
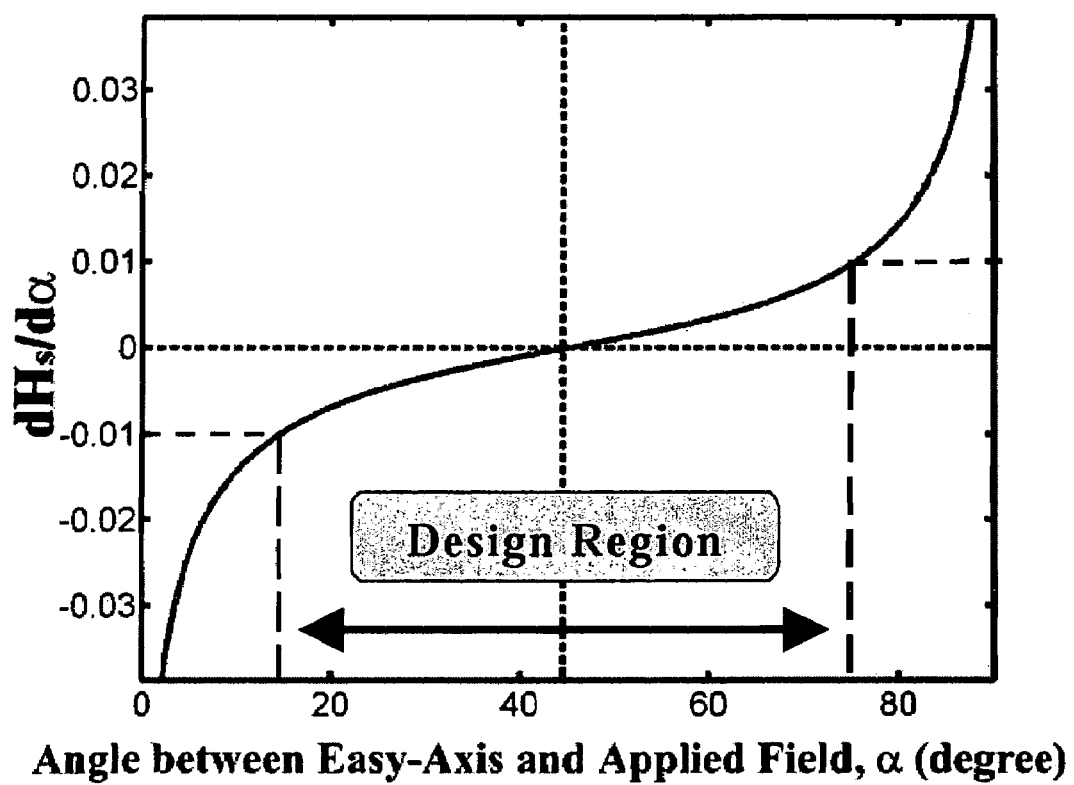
FIG. 10 is a graph of differential switching in relation to the angle of the tilted magnetic moment in a magnetic medium having a single magnetic layer.

It is further observed from FIG. 10 that the differential switching field over angle is minimal at the angle ranging from 10° to 80°. This indicates that the magnetic moment with a tilted easy axis varying within this range is less sensitive to dispersion of the applied field. Hence the magnetic moments with an easy axis tilted at an angle in this range are able to reverse more uniformly and generate less noise as compared to the magnetic moments in a longitudinal (0°) or perpendicular (90°) system. In actual application of the tilted medium, it is preferable that the magnetic moments tilt at an angle ranging from 10° to 45° when using a ring head and tilt at an angle ranging from 45° to 80° when using a single pole head. This indicates that when the magnetic medium has an easy axis tilted at an angle that falls within these ranges, the medium is less sensitive to the dispersion in the applied field, thereby improving the performance of the medium.

Figure 11:
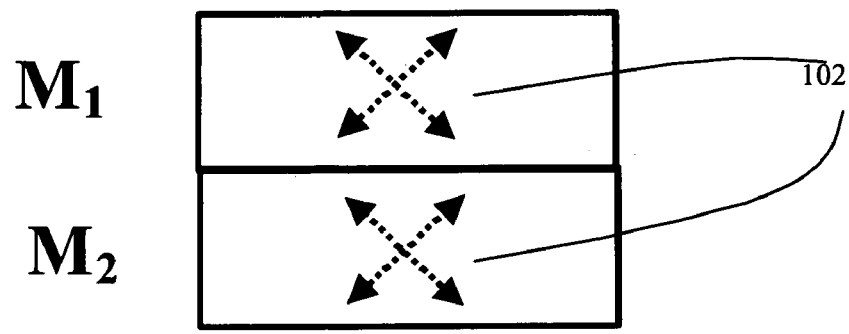
FIG. 11 is an illustration of the effective bi-axial easy axes due to exchange-coupling in each of the magnetic layers in the present invention.

One characteristic of the exchange-coupled system is that the remnant magnetic moments, $M_1$ and $M_2$, have effective easy axes 102 that are biaxial in character as illustrated in FIG. 11. The tilting remnant magnetic moments, $M_1$ and $M_2$, which have the directions of the remnant magnetic moments 15 and 17, are allowed to fall in either direction of the biaxial easy axes. The biaxial character of the effective easy axes of the remnant magnetic moments, $M_1$ and $M_2$, provides an advantage over existing prior art where the magnetic moments lie in effective easy axes that are uniaxial in character. When compared to prior art storage media that have a tilted uniaxial easy axis which restricts the direction of the magnetic moment, the biaxial character provides flexibility to the writing of data on the magnetic medium without compromising quality. The grains of a magnetic medium with a uniaxial tilted easy axis tilt either in the down-track or cross track direction, which provides a highly-oriented tilted medium. Although such highly-oriented media, particularly those with grains having easy axes tilted in the down-track directions, are acceptable for data storage applications, they are not achievable with current sputter deposition methods. In addition to this limitation, concentration of magnetic moments at the edges of tracks will expand the track width limiting the track density and areal density of such a medium. In a magnetic medium of the present invention with a biaxial easy axis, data bits can fall in an alternative direction avoiding concentration of dipole charge at the track edge. This reduces the interference with neighboring data bits, which reduces the overall transition and track edge noise providing an advantage over magnetic media with uniaxial easy axes.

Figure 12:
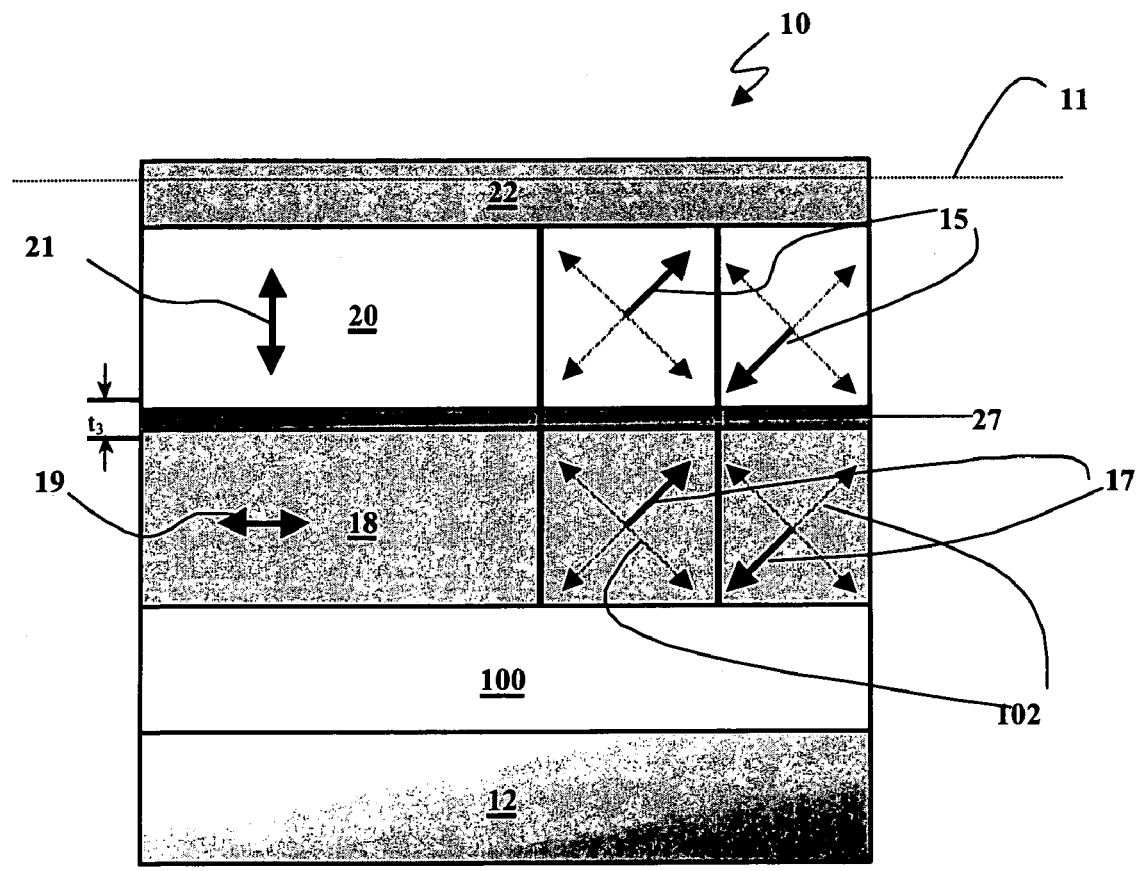
FIG. 12 is a schematic sectional view of the interaction of magnetic moments of the two magnetic layers, where an interlayer is disposed between the two layers.

In some embodiments, the exchange-coupling constant can be varied by inserting a thin interlayer of a high saturation magnetization material 27 between the first magnetic layer 18 and the second magnetic layer 20. FIG. 12 shows the structure of one preferred embodiment of the present invention with a thin interlayer 27 selected from a group of cobalt compounds, including pure cobalt and cobalt alloy. The function of the interlayer 27 is to enhance the exchange-coupling at the interface between the first magnetic layer 18 and the second magnetic layer 20. As such, the tilting angle of the respective layer can be tuned as desired for a specific recording system head. In the presence of the interlayer 27 a strong exchange-coupling can be achieved so that both magnetic moments from the first and second magnetic layers switch coherently and form a tilted angle in the same magnetization remnant state. The interlayer 27 may also be used in embodiments where the easy axes of the magnetic layers are switched as shown in FIG. 3. It is preferable to have the interlayer as thin as possible (below 1 nm) to maintain the recording performance. If the thickness of the interlayer 27 is beyond 1 nm, it is likely that the interlayer may contribute to horizontal expansion in the domain size of the magnetic medium. The thickness of the interlayer greater than 1 nm may also contribute additional signal to the overall recording which will add to the transition noise in a high recording density medium.

Figure 13:
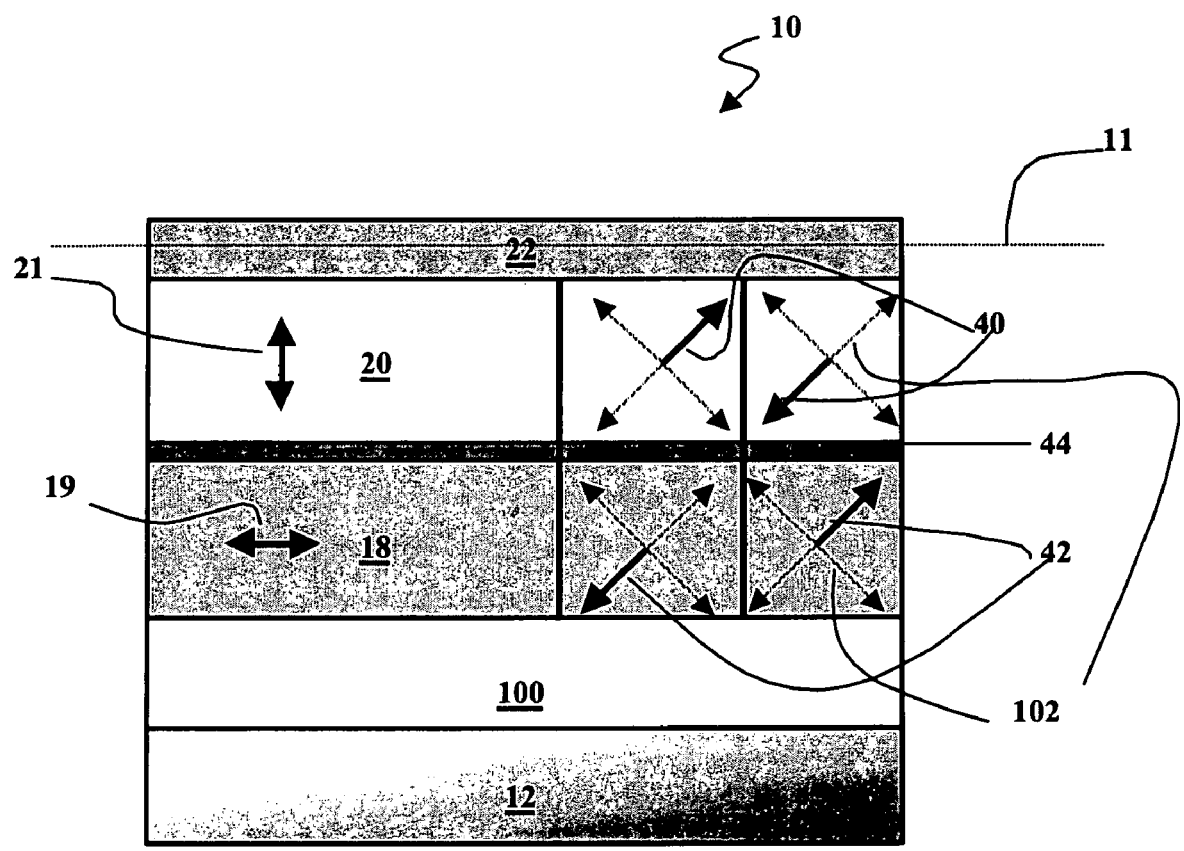
FIG. 13 is a schematic sectional view of the resultant magnetic moments at a recorded magnetic transition of the present invention, where an interlayer disposed between the top and bottom magnetic layer results in anti-parallel magnetic moments in the respective layers.

In other embodiments of the present invention, the selection of the type of non-magnetic material for the interlayer 44 and its thickness is used to fabricate a digital storage medium that has resultant magnetic moments, $M_1$ 40 and $M_2$ 42, anti-parallel to each other, as shown in FIG. 13, such that the remnant magnetic moment is low but non-zero. An example of the type of material that can be used to achieve this uses ruthenium (Ru) as part of the interlayer. The ruthenium can be disposed between two layers of cobalt, which are disposed between the first 18 and second 20 magnetic layers. The interaction of the exchange-coupling results in anti-parallel magnetic moments that are tilted at an angle to the plane 11 of the digital storage medium. Other types of non-magnetic materials that can be used for anti-ferromagnetic exchange-coupling include rhodium (Rh), chromium (Cr), copper (Cu), iridium (Ir), and their alloys.

Figure 14:
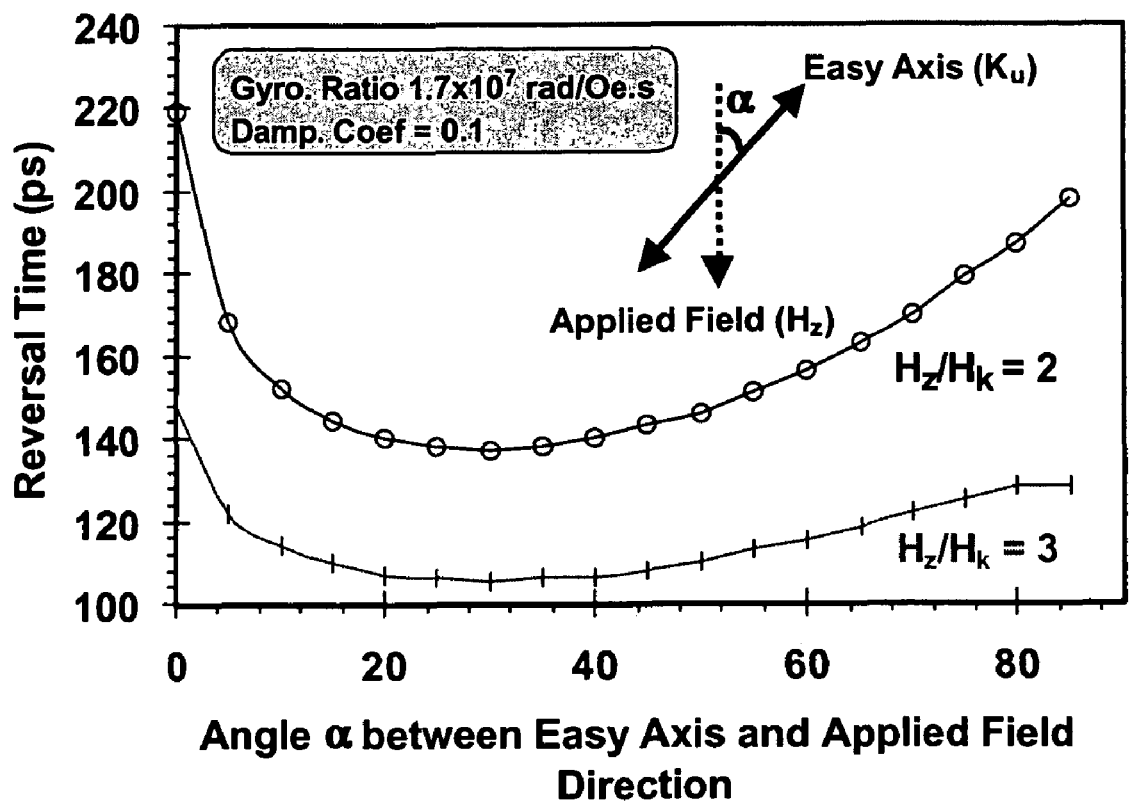
FIG. 14 is a graph showing the time required for switching the magnetic moments in a magnetic medium having tilted magnetic moments when a field is applied to the medium.

FIG. 14 compares the switching time required at tilted moments of various angles in two different normalized applied fields, $H_z/H_k=2$, and $H_z/H_k=3$, where $H_z$ is the applied external field, which is also known as the Zeeman field. It is observed from the plots that at $\theta=0°$, the reversal or switching time is 220 ps (picoseconds). Similarly, it can be observed from the trend of the plots that when $\theta=90°$ the switching time is comparably high. When the angle, $\theta$ ranges between 0° and 90°, the switching time is considerably lower at below 120 ps for the applied field at $H_z/H_k=3$, and below 160 ps for the applied field at $H_z/H_k=2$. This result shows that when magnetic moments are tilted at an acute angle, the time required to switch the magnetic moments is shorter. A shorter transition time also enables the write operations to be faster as compared to a longitudinal or perpendicular recording media. Hence, the faster transitions would serve extremely high recording density media that require very fast writing operations.

Figure 15:
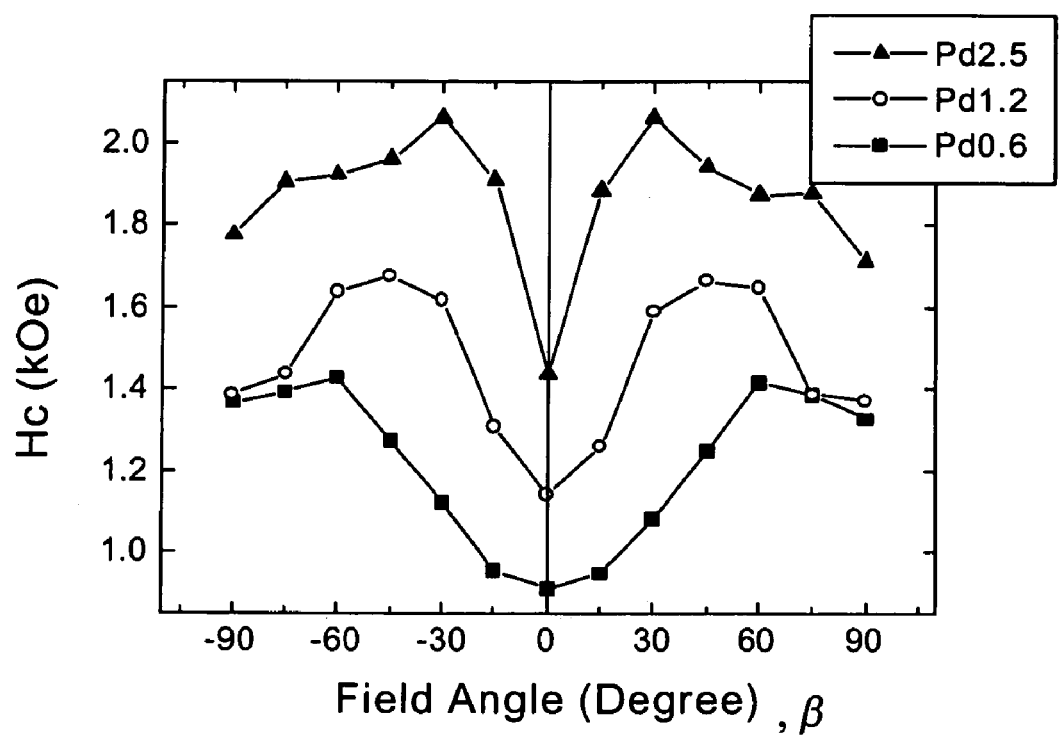
FIG. 15 is a graph of coercivity field in relation to angle dependence for the structure of FIG. 2 with Pd interlayer thicknesses of 0.6 nm, 1.2 nm, and 2.5 nm.

In an example of the present invention, the substrate 12 is formed from an aluminum magnesium (AlMg) or glass disk. The seed layer 13 is disposed on the substrate 12. The underlayer may be a chromium alloy deposited onto the seed layer 13. The intermediate layer 16 may include cobalt, chromium, and tantalum (CoCrTa). The first magnetic layer 18 disposed on the intermediate layer 16 includes cobalt (Co), chromium (Cr), platinum (Pt) and boron (B), to form an alloy, CoCrPtB. The second magnetic layer 20 includes a series of alternating cobalt/palladium (Co/Pd) layers, where the first contact layer 20a with the first magnetic layer can be a palladium or cobalt. Three samples, with different thickness for a Pd interlayer 20a interfaced with the CoCrPtB film were compared and the coercivity in relation to the field angle were measured at room temperature for each sample. These measurements are shown in FIG. 15. The field angle, β at 0° indicates that an external field was applied in the direction of the sample plane during measurement. At the field angle β=90°, the field is applied at a direction perpendicular to the plane during measurement. Varying the thickness of the first Pd layer 20a modifies the exchange coupling strength between the two ferromagnetic layers, 18 and 20.

Figure 16:
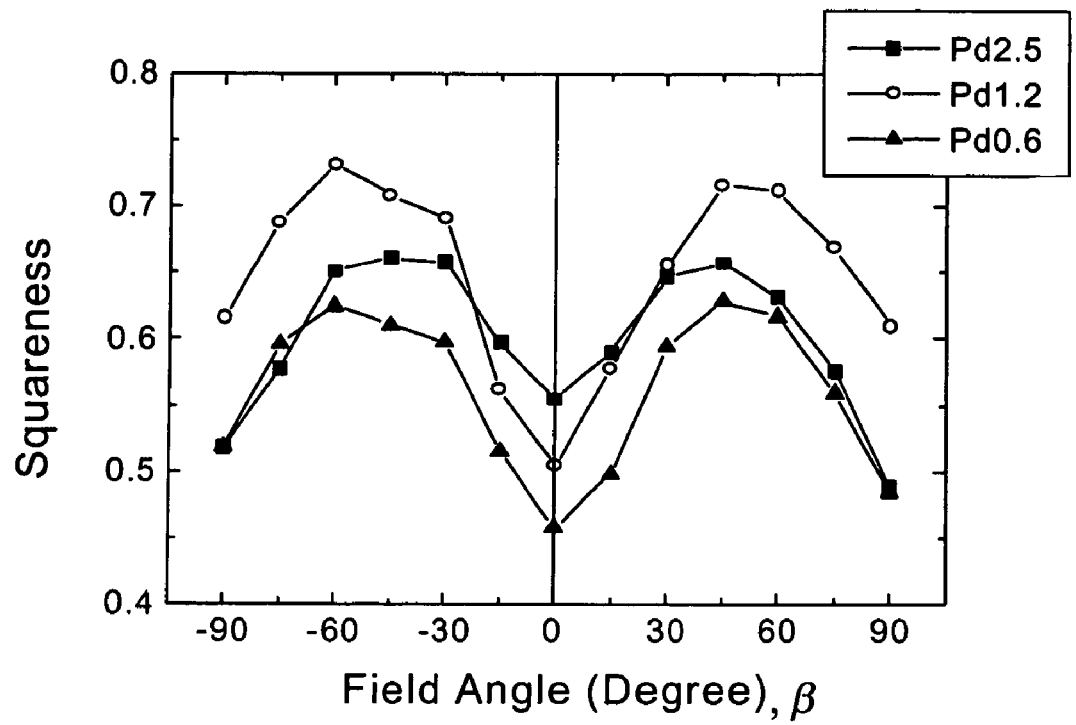
FIG. 16 is a graph of magnetization squareness and angle dependence for the structure of FIG. 2 with Pd interlayer layer thicknesses of 0.6 nm, 1.2 nm, and 2.5 nm.

The symmetry of the two peaks in FIG. 15 indicates a formation of the biaxial easy axes in all three examples where the thickness of the palladium is 0.6 nm, 1.2 nm, and 2.5 nm. The peaks are observed at angles occurring between 0° and 90° to the magnetic plane. In the sample where the thickness of palladium is 0.6 nm, two peaks occur at angle $\theta=\pm 60°$. As the thickness of the palladium layers increases further, the peaks shift to $\theta=\pm 45°$ at the thickness of 1.2 nm, and $\theta=\pm 30°$ at the thickness of 2.5 nm, and the coercivity is observed to increase with the thickness of the palladium layer. A similar angle dependent trend was observed for the magnetization squareness measurement, given by the ratio of the remnant magnetic moment and the saturation magnetization:

$$\frac{M_r}{M_s},$$

for the three samples as shown in FIG. 16. This observation re-enforces the conclusion that the exchange-coupling constant is enhanced by adjusting the thickness of the interlayer between the two magnetic layers 18 and 20.

Thermal stability is enhanced in the current invention because a higher anisotropy constant, $K_u$, can be achieved in the magnetic grains without affecting writing operations. The present invention allows the use of a longitudinal ring head, a perpendicular single pole head, or a transducer head that is capable of applying a writing field at an angle for recording purposes. This enables an increase in areal density with an increase in the coupled magnetic activation volume while at the same time thermal stability is increased.

It is to be noted that the above description is only illustrative of the present invention. Modification of the examples without departing from the scope and spirit of the present disclosure is possible to provide different versions of the invention.

We claim:

1. A digital storage medium, comprising:
   a substrate;
   a first magnetic layer disposed over the substrate, wherein the first magnetic layer has a first magnetic moment having a tilted easy axis;
   a second magnetic layer disposed over the first magnetic layer, wherein the second magnetic layer has a second magnetic moment having a tilted easy axis; and
   an overcoat layer disposed over the second magnetic layer,
   wherein the first magnetic layer has a perpendicular magnetic anisotropy and the second magnetic layer has a longitudinal anisotropy.

2. A digital storage medium, comprising:
   a substrate;
   a first magnetic layer disposed over the substrate, wherein the first magnetic layer has a first magnetic moment having a tilted easy axis;

a second magnetic layer disposed over the first magnetic layer, wherein the second magnetic layer has a second magnetic moment having a tilted easy axis; and an overcoat layer disposed over the second magnetic layer, wherein the first magnetic layer has a longitudinal magnetic anisotropy and the second magnetic layer has a perpendicular anisotropy.

3. The digital storage medium of claim 1 or 2, wherein the magnetic layer with the longitudinal anisotropy includes a material selected from a group consisting of cobalt (Co), iron (Fe), nickel (Ni), and alloys thereof.

4. The digital storage medium of claim 1, wherein the magnetic layer with the perpendicular anisotropy includes a material selected from a group consisting of cobalt, iron, and alloys thereof.

5. The digital storage medium of claim 2, wherein the magnetic layer with the perpendicular anisotropy includes a material selected from a group consisting of cobalt, iron, and alloys thereof.

6. The digital storage medium of claim 4, wherein the magnetic layer is formed from a single layer of alloys selected from a group consisting of cobalt-platinum (CoPt), cobalt-palladium (CoPd), cobalt-chromium-platinum (CoCrPt), cobalt-chromium-platinum-boron (CoCrPtB), cobalt-chromium-platinum-tantalum (CoCrPtTa), cobalt-chromium-platinum-niobium (CoCrPtNb), and iron-platinum (FePt).

7. The digital storage medium of claim 5, wherein the magnetic layer is formed from a single layer of alloys selected from a group consisting of cobalt-platinum (CoPt), cobalt-palladium (CoPd), cobalt-chromium-platinum (CoCrPtTa), cobalt-chromium-platinum-boron (CoCrPtB), cobalt-chromium-platinum-tantalum (CoCrPtTa), cobalt-chromium-platinum-niobium (CoCrPtNb), and iron-platinum (FePt).

8. The digital storage medium of claim 4, wherein the magnetic layer is formed from multiple layers of ferromagnetic materials selected from a group consisting of cobalt with palladium as a spacer layer (Co/Pd), cobalt with platinum as a spacer layer (Co/Pt), a cobalt alloy wilt palladium as a spacer layer, and a cobalt alloy with platinum as a spacer layer.

9. The digital storage medium of claim 5, wherein the magnetic layer is formed from multiple layers of ferromagnetic materials selected from a group consisting of cobalt with palladium as a spacer layer (Co/Pd), cobalt with platinum as a spacer layer (Co/Pt), a cobalt alloy with palladium as a spacer layer and a cobalt alloy with platinum as a spacer layer.

10. The digital storage medium of claim 6, wherein the alloys are doped with non-ferromagnetic materials selected from a group consisting of silicon oxide and silicon nitride.

11. The digital storage medium of claim 7, wherein the alloys are doped with non-ferromagnetic materials selected from a group consisting of silicon oxide and silicon nitride.

12. A digital storage medium, comprising:

a substrate;

a first magnetic layer disposed over the substrate, wherein the first magnetic layer has a first magnetic moment having a tilted easy axis;

a second magnetic layer disposed over the first magnetic layer, wherein the second magnetic layer has a second magnetic moment having a tilted easy axis;

an interlayer disposed between the first magnetic layer and the second magnetic layer; and an overcoat layer disposed over the second magnetic layer.

13. The digital storage medium of claim 12, wherein the interlayer includes a magnetization material selected from a group consisting of cobalt, nickel, iron, alloys of cobalt, alloys of nickel, alloys of iron.

14. The digital storage medium of claim 12, wherein the interlayer includes a non-magnetic material selected from a group consisting of ruthenium (Ru), rhodium (Rh), chromium (Cr), copper (Cu), iridium (Ir), and alloys thereof.

15. The digital storage medium of claim 1, further comprising an interlayer disposed between the first magnetic layer and the second magnetic layer.

16. The digital storage medium of claim 15, wherein the interlayer includes a magnetization material selected from a group consisting of cobalt, nickel, iron, alloys of cobalt, alloys of nickel, and alloys of iron.

17. The digital storage medium of claim 15, wherein the interlayer includes a non-magnetic material selected from a group consisting of ruthenium (Ru), rhodium (Rh), chromium (Cr), copper (Cu), iridium (Ir), and alloys thereof.

18. The digital storage medium of claim 2, further comprising an interlayer disposed between the first magnetic layer and the second magnetic layer.

19. The digital storage medium of claim 18, wherein the interlayer includes a magnetization material selected from a group consisting of cobalt, nickel, iron, alloys of cobalt, alloys of nickel, and alloys of iron.

20. The digital storage medium of claim 18, wherein the interlayer includes a non-magnetic material selected from a group consisting of ruthenium (Ru), rhodium (Rh), chromium (Cr), copper (Cu), iridium (Ir), and alloys thereof.

* * * * *